United States Patent [19]

Redman

[11] 4,270,732

[45] Jun. 2, 1981

[54] FLUID CONTROL VALVE

[76] Inventor: James C. Redman, 847 Cleveland Ave., Amherst, Ohio 44001

[21] Appl. No.: 76,215

[22] Filed: Sep. 17, 1979

[51] Int. Cl.³ .............................................. F16K 5/04
[52] U.S. Cl. ................................................ 251/310
[58] Field of Search ..................... 251/310, 175, 292

[56] References Cited

U.S. PATENT DOCUMENTS

| | | | |
|---|---|---|---|
| 857,463 | 6/1907 | Irwin | 251/310 |
| 955,390 | 4/1910 | Denegre | 251/310 |
| 1,138,613 | 5/1915 | Arndt | 251/310 |
| 1,160,342 | 11/1915 | Taft | 251/310 |
| 1,532,251 | 4/1925 | Lorraine | 251/310 |
| 1,567,389 | 12/1925 | Rubly | 251/310 |
| 2,002,550 | 5/1935 | Robertshaw | 251/310 |
| 3,612,102 | 10/1971 | Hulsey | 251/310 |
| 3,638,867 | 2/1972 | Venus, Jr. | 251/310 |

FOREIGN PATENT DOCUMENTS 810727  3/1959  United Kingdom ..................... 251/310

*Primary Examiner*—Martin P. Schwadron
*Assistant Examiner*—H. Jay Spiegel
*Attorney, Agent, or Firm*—Webster B. Harpman

[57] ABSTRACT

A fluid control valve has a cylindrical body member with inlet and outlet passages in spaced relation to one another. A control stem is movably positioned in a control chamber formed by the body member. A split expandable sleeve in the control chamber is movable by the control stem to provide overall volume control.

3 Claims, 6 Drawing Figures

FLUID CONTROL VALVE

BACKGROUND OF THE INVENTION (1) Field of the Invention:

This invention relates to fluid control devices of the type utilizing a single control means for fluid volume control.

(2) Description of the Prior Art:

Prior structures have utilized a variety of control means. See for example U.S. Pat. Nos. 1,016,382, 2,975,806 and 3,726,317.

In U.S. Pat. No. 1,016,382 a mixing valve is disclosed having a rotatable plug with pairs of slots engaging a pair of ports within a body member to control temperature and volume of a fluid.

Applicant's invention uses a floating split cylindrical sleeve to control the volume flow through an outlet port.

In U.S. Pat. No. 2,975,806 a mixing valve is disclosed using a tubular valve element having a number of O-rings to provide a seal.

In applicant's invention a floating split cylindrical sleeve is utilized that is rotatable relative to a port in the body member to regulate fluid volume.

U.S. Pat. No. 3,726,317 discloses a mixing valve having an apertured control stem and a series of O-rings to provide a seal between the inlets and the control stem.

Applicant's invention has a floating split cylindrical sleeve that engages the outlet port when rotated to control the volume of the fluid.

SUMMARY OF THE INVENTION

A fluid control valve has a cylindrical housing, a control stem rotatably positioned therein, a flexible split cylindrical sleeve is positioned in the housing in sealing relation and in operative relation to the control stem. The arrangement is such that rotation of the stem and sleeve controls communication of the split in the cylindrical sleeve with an outlet port in said housing and allows fluid from an inlet port in said housing to flow therethrough.

DESCRIPTION OF THE PREFERRED EMBODIMENT

Figure 1:
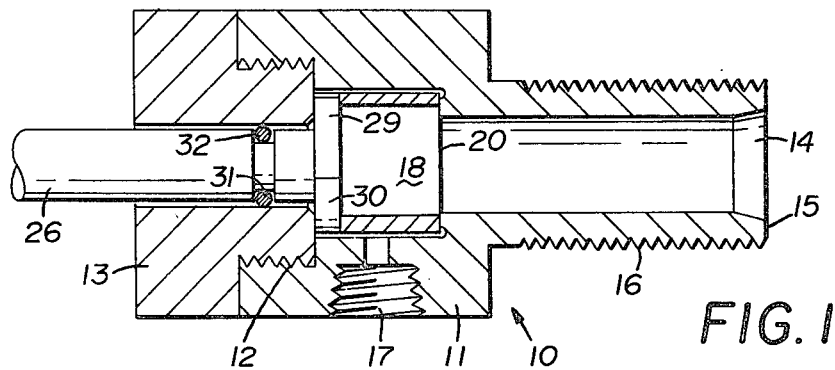
FIG. 1 is a sectional view of the valve in closed position.
Figure 6:
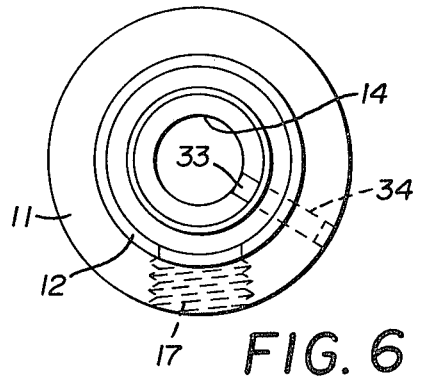
FIG. 6 is an end view on line 6—6 of FIG. 5.
Figure 5:
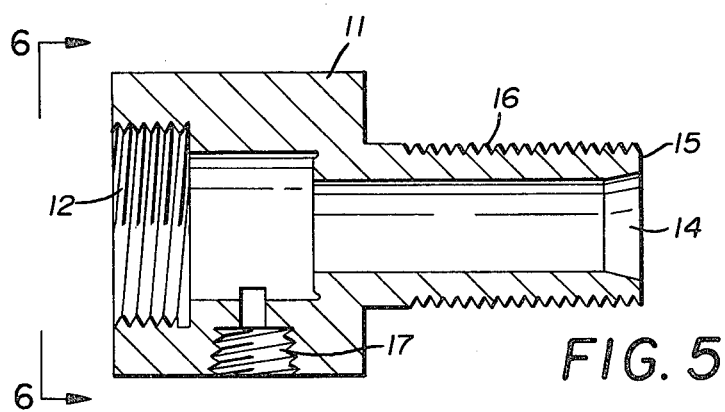
FIG. 5 is a sectional view of the cylindrical body member seen in FIG. 1.

A control valve as seen in FIGS. 1, 5 and 6 of the drawings and indicated at 10 comprises a cylindrical housing 11 with an internally threaded open end 12 in which a guide and support nut 13 is located. An inlet port 14 is centrally located in an opposite end 15 of the cylindrical housing 11. Said opposite end 15 has an area of reduced diameter which is externally threaded as at 16. A single outlet port 17, a portion of which is internally threaded is located at a point between said ends 12 and 15 of the cylindrical housing 11.

Figure 4:
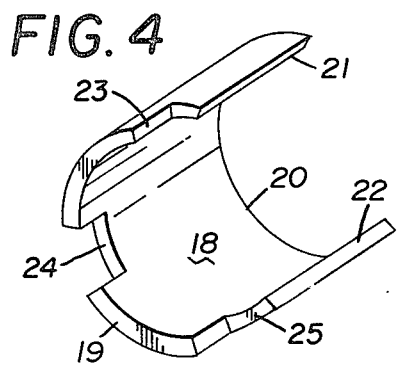
FIG. 4 is an enlarged perspective view of the split cylindrical sleeve seen in FIG. 1.

A split cylindrical sleeve 18 as seen in FIGS. 1 and 4 of the drawings, has ends 19 and 20 and longitudinally extending edge portions 21 and 22 defining a wide split therein. The split cylindrical sleeve 18 is of a varying wall thickness tapering from its thickest section adjacent the edge portion 22 to its thinnest at the other longitudinal edge portion 21. The end 19 is notched inwardly at three locations, 23, 24 and 25; two being coextensive with the edge portions 21 and 22, the other midway between the edge portions 21 and 22. The split cylindrical sleeve 18 is rotatably positioned in an area of comparable diameter in the cylindrical housing 11.

Figure 2:
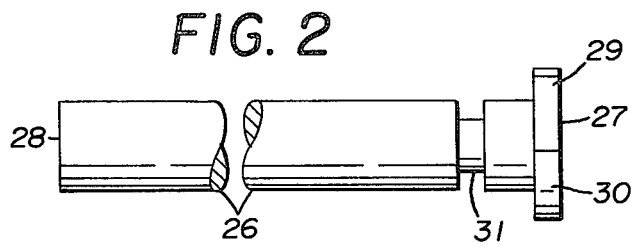
FIG. 2 is an enlarged view of the control stem of FIG. 1.
Figure 3:
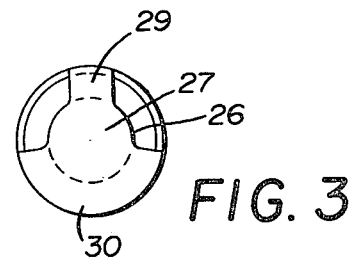
FIG. 3 is an end view of the control stem seen in FIG. 2.

Referring to FIGS. 2 and 3 of the drawings, a control stem 26 having ends 27 and 28 extends co-axially through the guide and support nut 13 into the cylindrical housing and the split cylindrical sleeve 18. The control stem 26 has a pair of positioning tabs 29 and 30 that extend radially outwardly from the end 27 thereof. Said tabs 29 and 30 are oppositely disposed from one another with the tab 30 extending around approximately one-half of the diameter of said stem 26. The tabs 29 and 30 are positioned to engage the notches 23, 24 and 25 located coextensively with the edge portions 21 and 22 and midway between the same respectively. Thus positioned the tabs 29 and 30 allow for rotation of the split cylindrical sleeve 18 by rotation of the control stem 26.

An annular groove 31 is formed in the control stem 26 inwardly of the end 27. An O-ring 32 is positioned in said groove 31 for a sealing relation between said control stem 26 and the interior of the cylindrical body housing 11 as best seen in FIG. 1 of the drawings.

A locking pin 33 as seen in FIG. 6 of the drawings, is positioned in an aperture 34 formed within the cylindrical housing 11 so as to limit the rotational movement of the split cylindrical sleeve 18 to a fully closed or open position.

The pin 33 engages the longitudinal edge portions 21 and 22 as the split cylindrical sleeve 18 is rotated. The split cylindrical sleeve 18 and control stem 26 are both secured within the cylindrical housing 11 by said guide and support nut 13. The split cylindrical sleeve 18 is formed of a resilient flexible material to assure a fluid tight sealing relation between said sleeve 18 and the inner surface of the cylindrical housing 11 and as formed is of a larger diameter than the inner diameter of the cylindrical housing 11 and must be partially collapsed to be positioned therein. The circumferentially progressively thicker wall thickness of the split cylindrical sleeve 18 from one side of the split therein to the other increases the resiliency thereof to a greater extent than the resiliency of the material of the sleeve 18 itself. The thicker portion of the split cylindrical sleeve 18 along its longitudinal edge portion 22 is disposed to register with the outlet port 17.

The split cylindrical sleeve 18 thus is in tension engagement with the cylindrical housing 11 and this results in an excellent fit due to the elastic properties of the plastic material of which the valve is formed.

Additionally the split cylindrical sleeve 18, by not being directly attached to the control stem 26, is free to expand and position itself in the cylindrical housing 11 while forming a large fluid delivery passageway between the inlet port 14 and the outlet port 17.

It will thus be seen that a new and useful valve has been disclosed which can easily be molded of plastic material and although but one embodiment of the present invention has been illustrated and described, it will be apparent to those skilled in the art that various changes and modifications may be made therein without departing from the spirit of the invention.

Having thus described my invention, what I claim is:

1. A fluid control valve consisting of:
a cylindrical housing having a longitudinal bore and a radial bore;
a resilient expandable split sleeve having end edges and side edges and being continuous between said edges, said side edges being spaced from each other to define a split oriented longitudinally of said sleeve, said split being large relative to the diameter of said sleeve and extending for the entire length of said sleeve, said sleeve being progressively thicker circumferentially from one side edge to the other side edge with said one side edge being the thickest portion of said sleeve and said other side edge being the thinnest portion of said sleeve, said sleeve including notches defined in one of said end edges and having an external diameter at least as great as the internal diameter of said longitudinal bore, said sleeve being positioned within said longitudinal bore to be coaxial with said longitudinal bore and rotatable about a longitudinal centerline of said sleeve;
a control stem longitudinally positiond partially within said longitudinal bore, said stem having tabs on one end thereof, said tabs extending radially of said longitudinal bore, said tabs being engaged with said notches so that rotation of said stem causes corresponding rotation of said sleeve;
a support means holding said stem in said housing;
said split in said sleeve fluidly connecting said longitudinal bore with said radial bore and being the only means of such fluid communication whereby the control valve is shut off when said split is not in communication with said radial bore.

2. The fluid control valve set forth in claim 1 wherein said split expandable sleeve is formed of a flexible material with its outer surface arranged for sealing sliding relation with said hollow body member when expanded by fluid pressure therein.

3. The fluid control valve set forth in claim 1 wherein a guide and support nut is engaged in said fluid control valve at one end of said cylindrical valve chamber, said control stem positioned through an axial bore in said guide and support nut.

* * * * *